US011238386B2

(12) United States Patent
Lehmann et al.

(10) Patent No.: US 11,238,386 B2
(45) Date of Patent: Feb. 1, 2022

(54) TASK DERIVATION FOR WORKFLOWS

(71) Applicant: SAP SE, Walldorf (DE)

(72) Inventors: Volker Lehmann, Mühlhausen (DE); Andre Hofeditz, Nussloch (DE); Tobias Breyer, Mannheim (DE); Krassimir Kondarev, Walldorf (DE)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 16/226,912

(22) Filed: Dec. 20, 2018

(65) Prior Publication Data

US 2020/0202273 A1   Jun. 25, 2020

(51) Int. Cl.
*G06Q 10/06* (2012.01)
*G06F 3/0482* (2013.01)

(52) U.S. Cl.
CPC ... *G06Q 10/06316* (2013.01); *G06Q 10/0633* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 6,321,133 B1 * | 11/2001 | Smirnov | G06Q 10/06 700/100 |
| 6,550,057 B1 | 4/2003 | Bowman-Amuah et al. | |
| 7,743,150 B1 | 6/2010 | Carter et al. | |
| 7,966,260 B2 | 6/2011 | Gernold | |
| 7,996,374 B1 | 8/2011 | Jones et al. | |
| 8,010,484 B2 | 8/2011 | Gernold | |
| 8,091,043 B2 | 1/2012 | Schubert et al. | |
| 8,307,373 B2 | 11/2012 | Day | |
| 8,316,380 B2 | 11/2012 | Keil et al. | |
| 8,745,635 B2 | 6/2014 | Balko et al. | |
| 8,825,798 B1 | 9/2014 | Johnson et al. | |
| 8,839,186 B2 | 9/2014 | Day | |

(Continued)

OTHER PUBLICATIONS

Deelman, Ewa, et al. "Workflow management in GriPhyN." Grid Resource Management. Springer, Boston, MA, 2004. 99-116. (Year: 2004).*

(Continued)

*Primary Examiner* — Thomas L Mansfield
(74) *Attorney, Agent, or Firm* — Fish & Richardson P.C.

(57) ABSTRACT

Techniques are described for workflow management, including automatically deriving characteristics of a user task node in a workflow based on an analysis of other workflow elements such as conditional sequence connectors. In some implementations, elements of a workflow presented in the modeler user interface of a workflow management platform are analyzed, and element(s) of the workflow are automatically and dynamically modified based on the analysis. For example, a workflow may include a first user task that is connected to subsequent node(s) in the workflow, such as other user task(s) downstream from the first user task. The first user task may be connected to each subsequent node by a conditional sequence connector. The condition information for each connector can be extracted from the workflow information and used to automatically modify the first user task to include decision branches for each element of condition information extracted from a respective connector.

17 Claims, 9 Drawing Sheets

(56) References Cited

U.S. PATENT DOCUMENTS

| | | |
|---|---|---|
| 8,849,691 B2 | 9/2014 | Sanabria et al. |
| 8,904,343 B2 | 12/2014 | Balko et al. |
| 8,930,325 B2 | 1/2015 | Cochrane et al. |
| 8,930,497 B1 | 1/2015 | Holmes et al. |
| 8,972,868 B2 | 3/2015 | Schubert |
| 9,721,230 B2 | 8/2017 | Trump et al. |
| 2002/0122543 A1 | 9/2002 | Rowen et al. |
| 2002/0154010 A1 | 10/2002 | Tu et al. |
| 2003/0041178 A1 | 2/2003 | Brouk et al. |
| 2003/0217094 A1 | 11/2003 | Andrews et al. |
| 2004/0186891 A1 | 9/2004 | Panec et al. |
| 2004/0254945 A1 | 12/2004 | Schmidt et al. |
| 2005/0060643 A1 | 3/2005 | Glass et al. |
| 2005/0278270 A1 | 12/2005 | Carr et al. |
| 2006/0235714 A1 | 10/2006 | Adinolfi et al. |
| 2007/0165625 A1 | 7/2007 | Eisner et al. |
| 2007/0276715 A1 | 11/2007 | Beringer |
| 2008/0115195 A1 | 5/2008 | Malek |
| 2008/0134203 A1 | 6/2008 | Weber et al. |
| 2008/0167925 A1 | 7/2008 | Mehta et al. |
| 2008/0177691 A1 | 7/2008 | Alperovitch et al. |
| 2008/0275957 A1 | 11/2008 | Pouzin et al. |
| 2008/0301136 A1 | 12/2008 | De Pauw et al. |
| 2009/0048891 A1 | 2/2009 | Ottavi et al. |
| 2009/0064130 A1 | 3/2009 | Davis |
| 2009/0089078 A1 | 4/2009 | Bursey et al. |
| 2009/0112873 A1 | 4/2009 | Nanjangud Bhaskar et al. |
| 2009/0198533 A1 | 8/2009 | Narayanaswamy et al. |
| 2009/0313638 A1 | 12/2009 | Shetty |
| 2010/0070973 A1 | 3/2010 | Addala et al. |
| 2010/0106547 A1* | 4/2010 | Adi .................. G06F 8/30 705/7.27 |
| 2010/0161362 A1 | 6/2010 | Shapira et al. |
| 2010/0223260 A1 | 9/2010 | Wu et al. |
| 2011/0302593 A1 | 12/2011 | Gatesman et al. |
| 2012/0005659 A1 | 1/2012 | Bonanno et al. |
| 2012/0030573 A1 | 2/2012 | Balko et al. |
| 2012/0078809 A1 | 3/2012 | Day |
| 2012/0271854 A1 | 10/2012 | Truong et al. |
| 2013/0007006 A1 | 1/2013 | Chung |
| 2013/0067476 A1 | 3/2013 | Rosenberg et al. |
| 2013/0212073 A1 | 8/2013 | Cochrane et al. |
| 2013/0246112 A1* | 9/2013 | Comstock ........ G06Q 10/06315 705/7.15 |
| 2013/0347004 A1 | 12/2013 | Day et al. |
| 2014/0013315 A1 | 1/2014 | Genevski |
| 2014/0195287 A1 | 7/2014 | Fraser |
| 2015/0088980 A1* | 3/2015 | Lakes .................. H04L 67/02 709/203 |
| 2015/0149257 A1* | 5/2015 | Bielat ................ G06Q 10/0637 705/7.36 |
| 2016/0342897 A1* | 11/2016 | Helfman .............. G06F 40/18 |
| 2017/0039046 A1 | 2/2017 | Henke et al. |
| 2017/0039385 A1 | 2/2017 | Henke et al. |
| 2017/0039492 A1 | 2/2017 | Henke et al. |
| 2017/0039520 A1 | 2/2017 | Trump |
| 2017/0039521 A1 | 2/2017 | Henke et al. |

OTHER PUBLICATIONS

U.S. Appl. No. 14/300,891, Rouven Day, filed Jun. 10, 2014.
U.S. Appl. No. 16/026,406, Lehmann et al., filed Jul. 3, 2018.
U.S. Appl. No. 16/034,880, Kondarev, Krassimir, filed Jul. 13, 2018.
U.S. Appl. No. 16/208,789, Lehmann et al., filed Dec. 4, 2018.

* cited by examiner

TASK DERIVATION FOR WORKFLOWS

BACKGROUND

Various software tools are available to assist organizations in managing various types of workflows. In general, a workflow management tool may include an interface that allows a user to design a workflow by specifying nodes (e.g., events, actions, etc.) in the workflow and connecting them to specify a control flow. Execution of the workflow may initiate other events or decisions within the organization in an automated fashion, to facilitate a process.

SUMMARY

Implementations of the present disclosure are generally directed to workflow management. More particularly, implementations of the present disclosure are directed to automatically deriving user task node characteristics based on an analysis of other workflow elements such as conditional sequence connectors.

In general, implementations of innovative aspects of the subject matter described in this specification can be embodied in a method that includes the following operations: accessing workflow information describing a workflow that includes multiple nodes and at least one connector that connects at least one pair of the nodes, the workflow specified through a user interface (UI) of a workflow management platform; analyzing the workflow information to identify one of the nodes that is a user task node and that is connected, by a respective conditional sequence connector, to each of at least one other subsequent node in the workflow; extracting condition information from each conditional sequence connector; and modifying the user task to include decision information that is generated based on the extracted condition information, including dynamically updating a presentation of the user task in the UI to indicate the decision information included in the user task.

These and other implementations can each optionally include one or more of the following innovative aspects: the decision information includes a label that is designated for the conditional sequence connector through the UI; each conditional sequence connector corresponds to a branch of a decision associated with the decision information; modifying the user task further includes incorporating the decision information into metadata that describes the user task in the workflow information; the metadata is arranged according to a version of a Business Process Model and Notation (BPMN) format; the operations further include executing the workflow including the user task with the included decision information; and/or the user task is further modified to include additional decision information that is determined based on context information associated with the workflow.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
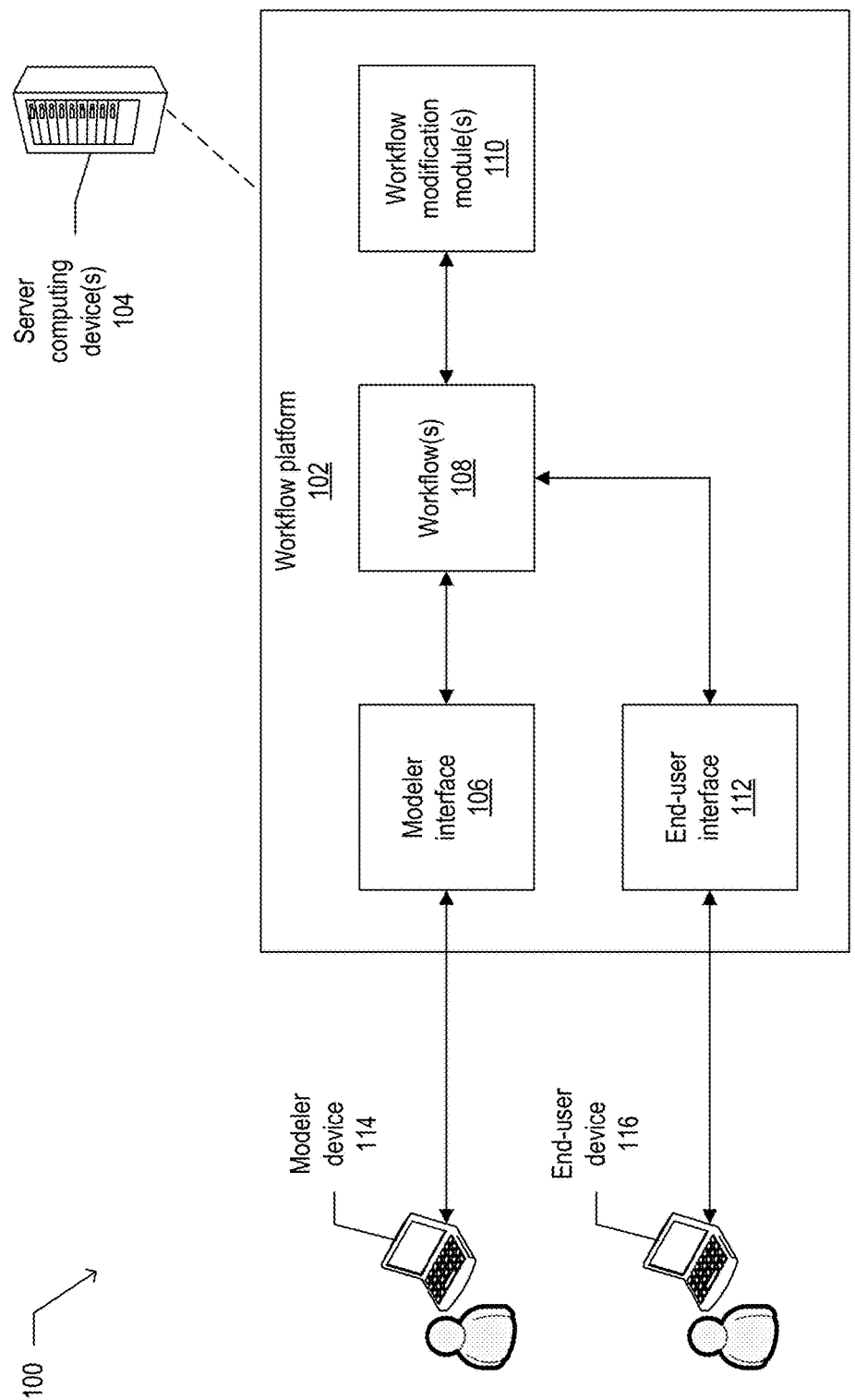
FIG. 1 depicts an example system for workflow management, according to implementations of the present disclosure.

Implementations of the present disclosure are directed to techniques for workflow management, including automatically deriving characteristics of a user task node in a workflow based on an analysis of other workflow elements such as conditional sequence connectors. In some implementations, elements of a workflow presented in the modeler user interface (UI) of a workflow management platform are analyzed, and at least one other element of the workflow is automatically and dynamically modified based on the analysis. For example, a workflow may include a first user task that is connected to multiple subsequent nodes in the workflow, such as multiple subsequent user tasks that can be downstream from the first user task in the workflow. The first user task may be connected to each of the subsequent nodes by a connector such as a conditional sequence connector. The condition information (e.g., label) of each condition sequence connector can be extracted from the workflow information and used to automatically modify the first user task to include decision branches for each element of condition information extracted from a respective condition sequence connector. In this way, implementations provide for the derivation of user task decisions based on the workflow modeling.

Traditionally, workflow management tools have often posed difficulties in their user experience. For example, a major challenge for a user (e.g., modeler) when working with user decisions has been to make the process of specifying and then using the user decisions in the subsequent flow as intuitive and visual as possible. Another challenge for a modeler is to keep the decisions in a task in sync with the modelling of the flow. Workflows, user tasks, decisions, and control flow can evolve over time, with new decisions being added, and/or existing decisions being modified (e.g. named) or removed. Traditionally, workflow management tools have not made user task management simple under such circumstances.

Implementations address these problems and provide technical improvements and/or technical advantages over the previously available solutions. Using the modeling platform described herein, a modeler can spend less time in configuration screens to achieve a first running version of a workflow, while also being provided a more expressive visualization of decisions on a user task. For example, using the workflow platform provided by the implementations described herein, a modeler can first create a blank conditional flow starting from a user task, and name the blank conditional flow "Approved". The same process can be repeated for "Rejected" and "Forwarded" conditional flows coming from the user task. The platform can automatically generate those three decision branches on the user task such that they are visible and actionable in the end-user's inbox and the task execution UI. The modeler can connect those sequence flows to follow-up activities without additional configuration needed. Moreover, for a detailed configuration, it is also possible to switch to the configuration section on task level as desired by the modeler.

FIG. 1 depicts an example system 100 for workflow management, according to implementations of the present disclosure. As shown in this example, a workflow platform 102 is hosted on, or otherwise provided by, one or more server computing devices 104. The device(s) 104 can include any suitable type and number of computing device(s), and may include distributed computing device(s) (e.g., cloud server(s)). The workflow platform 102, also described as the workflow management platform or the platform, can provide functionality for the design (e.g., modeling) of workflows of any appropriate type, storage of information describing the workflows, and execution of workflow(s). In some examples, the platform is part of SAP™ Business Process Management, SAP™ Business Workflow, and/or SAP™ Cloud Platform Workflow.

The platform can include graphical UIs, including a modeler interface 106 and an end-user interface 112. A modeler user (or modeler) can use a modeler device 114 to access the modeler interface 106 to create and edit workflow(s) 108, which may be stored on the platform or elsewhere. A workflow 108 may be described using any suitable format, such as a version of Business Process Model and Notation (BPMN) format. The modeler interface 106 may enable the modeler to graphically select and arrange nodes to be included in a workflow, connect the nodes sequentially for serial and/or parallel execution, specify characteristics and/or parameters for the nodes, and/or perform other tasks to design a workflow 108. The end-user interface 112 may output information that is generated by the execution of a workflow 108, and may be accessed by an end-user using an end-user device 116. The modeler device 114 and end-user device 116 can be any suitable type of computing device.

In some implementations, the platform includes one or more workflow modification modules 110. The module(s) 110 can analyze a workflow (e.g., as it is being designed in the modeler interface 106), and dynamically generate modifications to elements of the workflow based on other elements of the workflow. As described herein, such modifications can include automatically and dynamically altering a user task node to include decision information based on an analysis of conditional sequence connectors that have been added to the workflow as coming out of the user task node.

The platform can enable process automation by defining workflows in a graphical representation using BPMN, or some other suitable format, and executing the workflows based upon those definitions. A workflow can include various elements including multiple activities such as user tasks (e.g., interaction steps) and/or automated service tasks (e.g., service calls), gateways (e.g., for control flow), and/or sequence flows connecting the elements to build an executable process workflow. The platform simplifies the definition of workflows, automates their execution, and makes the workflow definition readily understandable by a modeler. Examples for user interaction can be single-step or multi-step approvals.

In some examples, a user task is an activity in the workflow that illustrates a task that a human performs and usually includes some sort of user interface displaying relevant data and actions to drive the status of the task (e.g. "Complete," "Forward," etc.). Existing tasks can appear in the inbox of assigned end users where the tasks can be accessed and processed. Alternative methods of access include task notification in some other UI, and/or a direct execution link sent in email. Decisions on a task can be custom actions defined on a user task during the workflow modeling, which can then be exposed via application programming interfaces (APIs) and offered as actions in the end-user's inbox (e.g. "Approve," "Reject," etc.) or task execution UI. Those actions can then, for example, be generically rendered as buttons in the task user interface or even offered as an action on the task without opening the task details (e.g., directly from the list of available tasks for a user). An example of task notification and exposure is described below with reference to FIG. 3.

Figure 2:
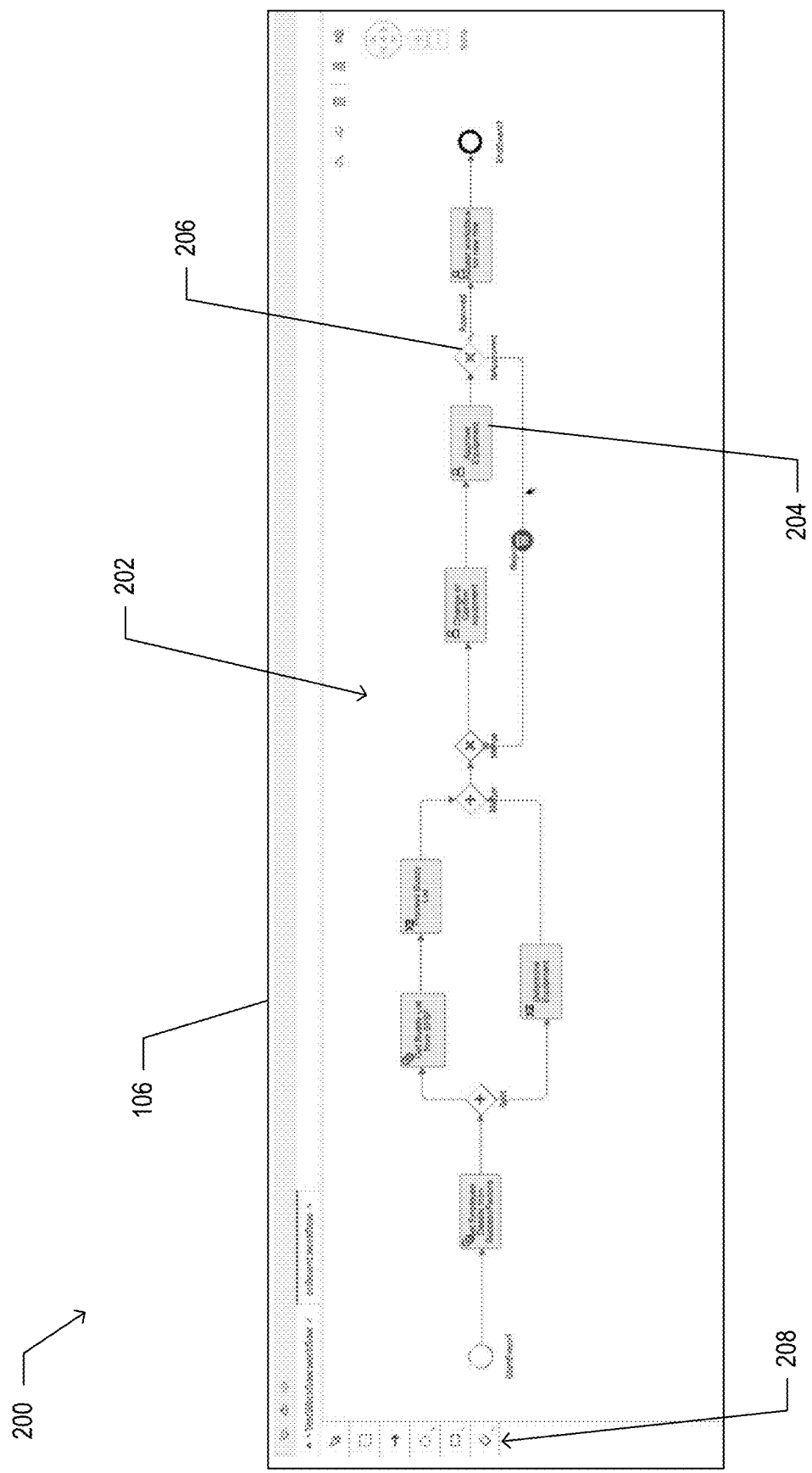
FIG. 2 depicts an example user interface for workflow management, according to implementations of the present disclosure.

FIG. 2 depicts an example 200 of the modeler interface 106 that can be used for workflow design and management, according to implementations of the present disclosure. As shown in this example, the interface 106 is being used to model a workflow 202 that includes various elements, such as user tasks 204, decision nodes 206, and connectors that connect the various elements. The interface 106 can include various menus, such as example menu 208 that enables the modeler to select elements to add to the workflow 202.

In the example of FIG. 2, decision elements are specified in the workflow 202 using decision nodes such as node 206. Decision functionality can also be incorporated into a user task itself, instead of having the decision specified in a separate workflow element (e.g., node 206). In some examples, the definition and configuration of such decisions is performed on the user task element in the workflow model, e.g., using a table-style configuration screen. For each action the modeler can specify a technical identifier for the decision and a translatable text that is later displayed to the end-user. Further, the decision may have a nature property which affects the later rendering of the user task (e.g., positive, negative, or neutral), and a property to request an optional or mandatory comment from the user triggering the action. The subsequent flow in the workflow model can then react upon the decision taken in the task. The benefit of such decisions (e.g., custom actions) is that they can be defined and used at design time directly in the process model. At runtime, the decisions can automatically be exposed via an API to the respective inbox of the end-users. The UI of the task does not have to be adapted but the inbox or any task application can generically render those decisions to the end-user as options to choose from and report the user decision back into the process execution where the flow can then again react upon this decision.

Figure 3:
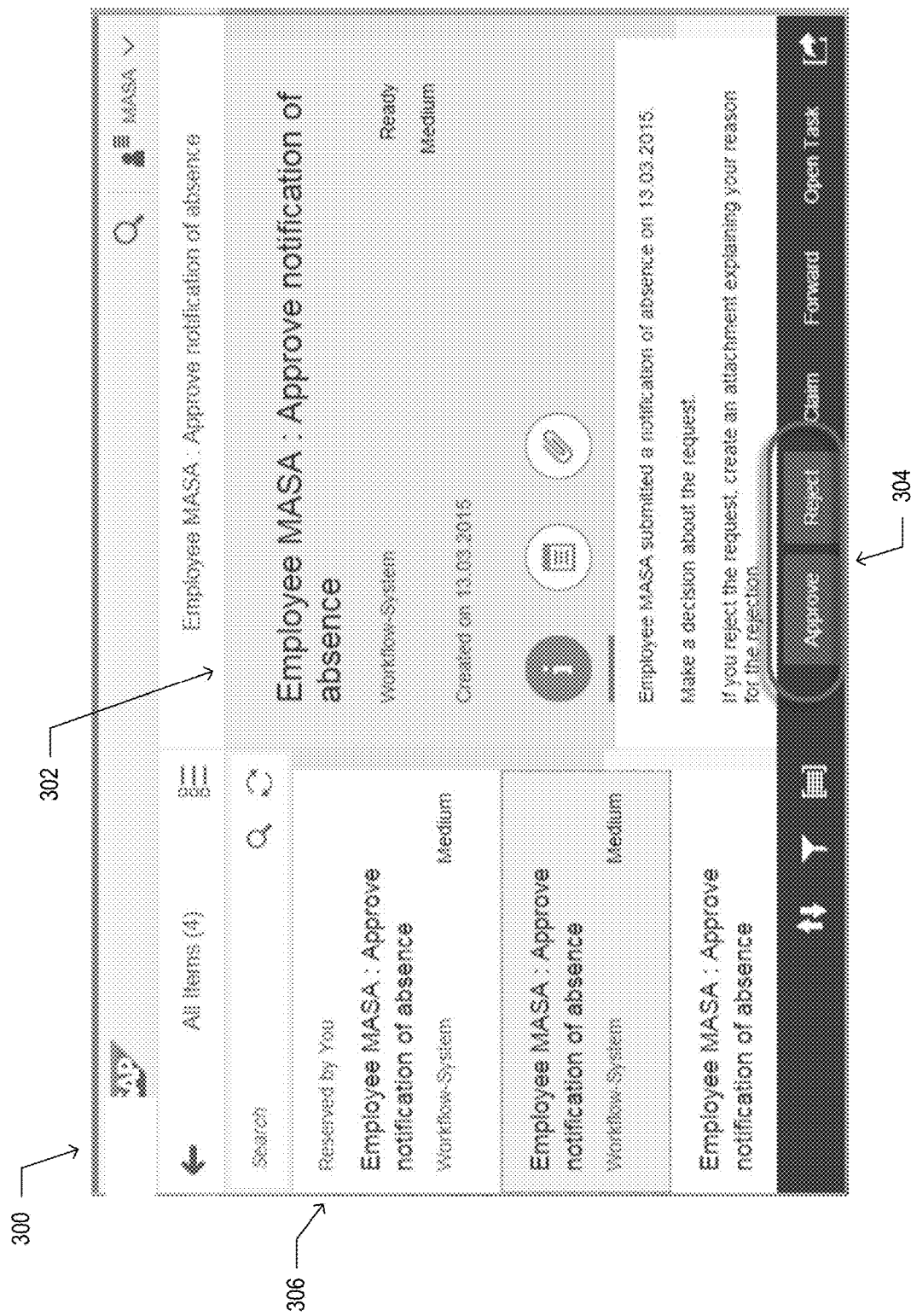
FIG. 3 depicts an example user interface associated with a workflow, according to implementations of the present disclosure.

FIG. 3 depicts an example UI 300 associated with a workflow, according to implementations of the present disclosure. Such a UI can be presented to an end-user through the end-user interface 112. As shown in this example, an inbox 306 is presented to an end-user, from which the end-user can select among the tasks shown in the inbox. A selection of a task in the inbox causes the interface to show a detailed view 302 of the task, along with decision controls 304 that allow the end-user to make a decision regarding the task (e.g., "Approve" or "Reject").

Figure 4A:
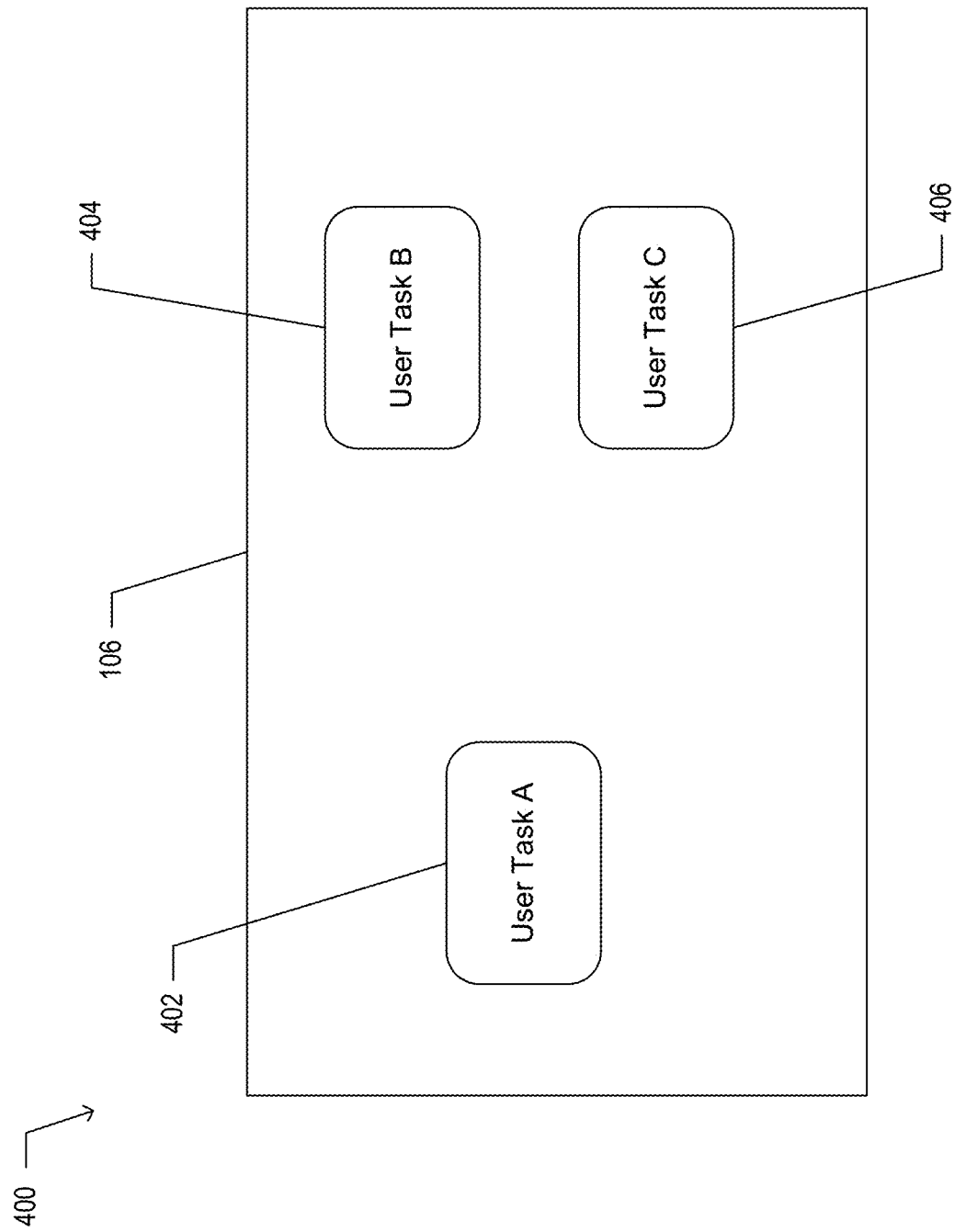
FIGS. 4A-4C depict example user interfaces with dynamic modification of element(s), according to implementations of the present disclosure.
Figure 4B:
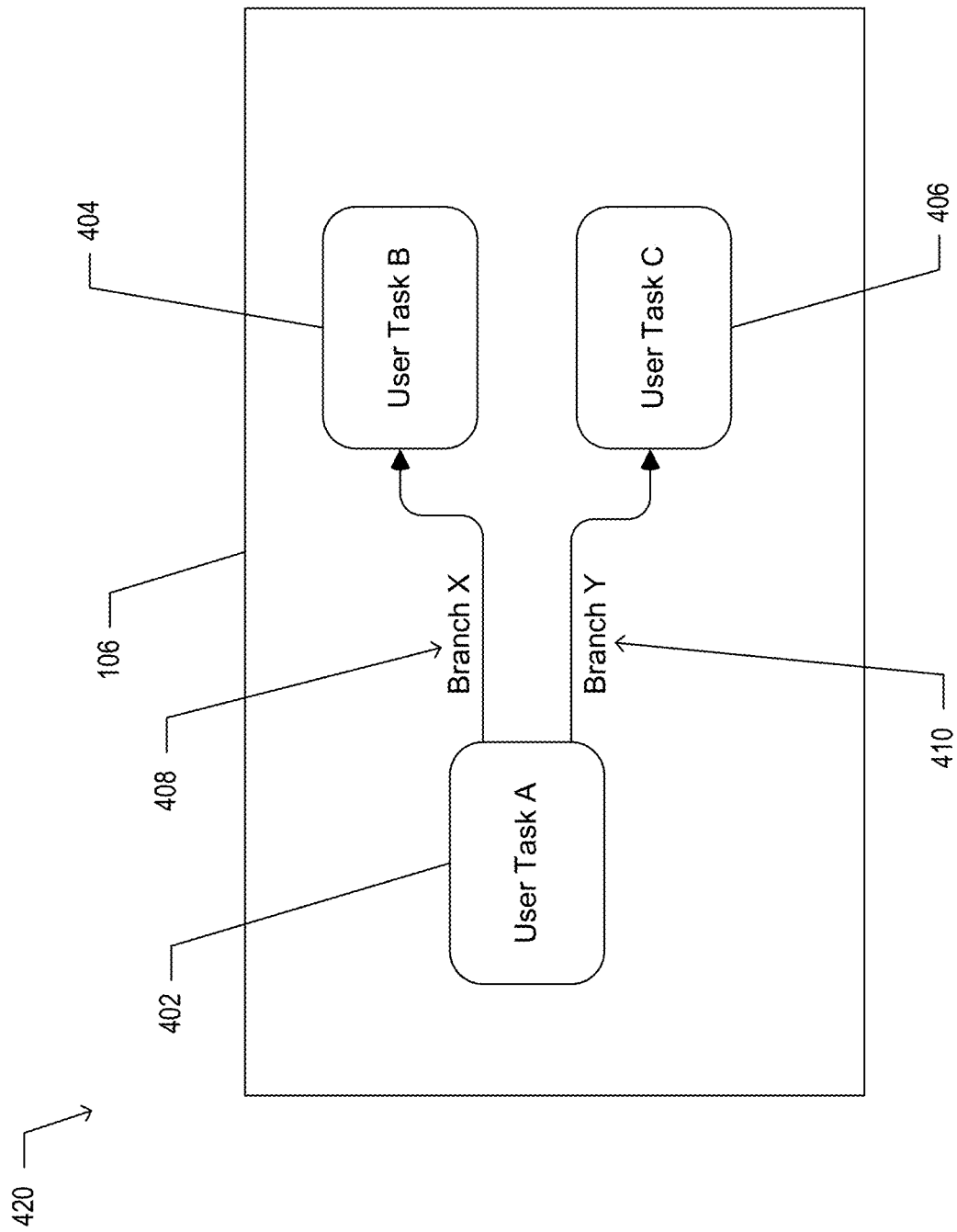
Figure 4C:
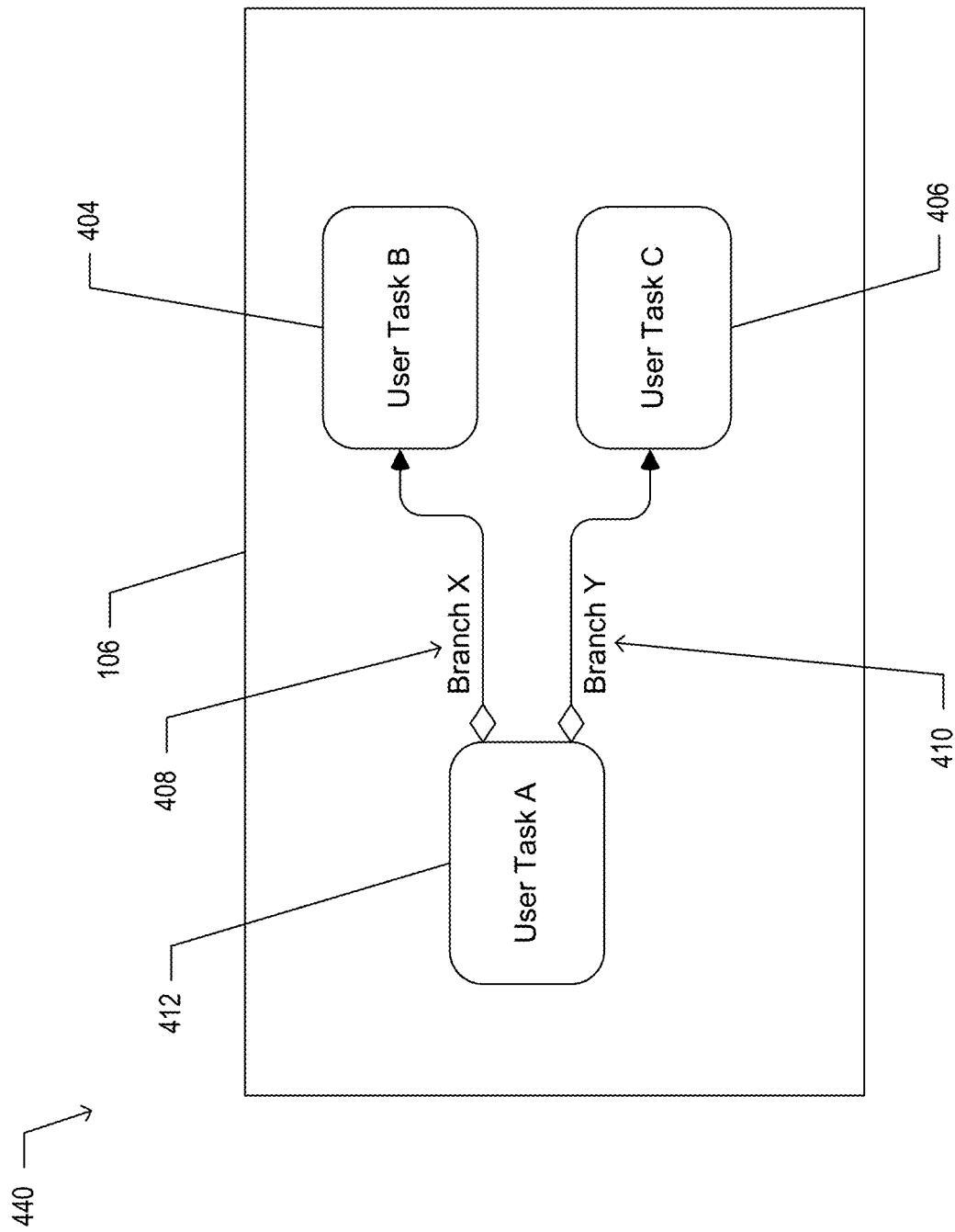

FIGS. 4A-4C depict example user interfaces with dynamic modification of element(s), according to implementations of the present disclosure. These examples may be presented in the modeler interface 106, and illustrate the modeler view of a workflow element (e.g., user task) being dynamically modified at design-time.

As shown in FIG. 4A, the modeler has added three user tasks 402, 404, and 406 for inclusion in a workflow, labeled User Task A, User Task B, and User Task C respectively.

In the example of FIG. 4B, the modeler has added two additional elements 408 and 410 to the workflow, conditional sequence connectors with condition information (e.g., label) Branch X and Branch Y respectively. The Branch X connector connects User Task A to User Task B, and the Branch Y connector connects User Task A to User Task C. Branch X and Branch Y can indicate decision branches that the workflow can follow after User Task A. For example, Branch X can be "Approve," and Branch Y can be "Reject."

In the example of FIG. 4C, the platform (e.g., the module(s) 110) have automatically and dynamically modified the User Task A node to include the decision information directly in the user task. This modification can be based on extraction of the condition information (e.g., label) from each of the conditional sequence connectors. The modification can be based on an inference that the workflow is to execute User Task B if the decision Branch X is chosen, and User Task C if the decision Branch Y is chosen. Accordingly, the platform has enough information based on the conditional sequence connectors to determine the decision that is to be made as part of the User Task A, e.g., a choice between Branch X and Branch Y. In this way, conditional sequence connectors can be used to define and visualize decisions on a user task.

A sequence flow defines the order in which activities in a process are executed (e.g., as a control flow). In BPMN, there are two special types of sequence flows:

1) Conditional Sequence Flow—has a condition assigned that defines whether or not the flow is executed at runtime. This can also be described as a conditional sequence connector.

2) Default Sequence Flow—is the default branch to be chosen if all other conditions evaluate to false.

For user tasks, the conditional sequence flows can be used to derive decisions based on the flow modelling. For example, modeling a conditional sequence flow from the task and naming it 'Reject' indicates the modeler's intent of having "Reject" as a decision option on the user task that the flow is connected to. The workflow system can hence create a decision "Reject" on the user task if it is not yet present.

Further, in some implementations this paradigm is extended to include upcoming data flow. For example, when the modeler connects the conditional flow to an exclusive gateway and specifies context expressions, it is inferred that those attributes are relevant for the decision and automatically added as decision context which can in turn be automatically exposed via API and rendered in the inbox. As a decision ultimately can include more complex configuration attributes that may not be exposed in the flow modelling, a configuration interface may also be used on the user task level to further provide detail and/or modify decisions. In some implementations, this can be a property sheet with a table containing the available attributes, such as the nature of a decision which can determine the button color of the decision as rendered in the inbox.

Figure 5:
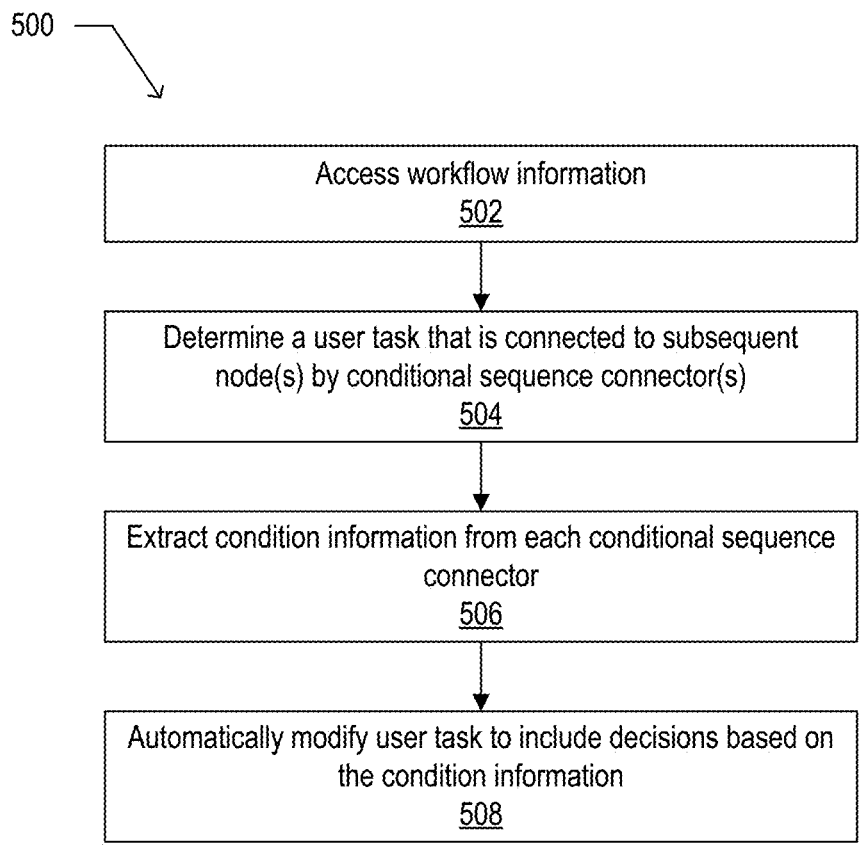
FIG. 5 depicts a flow diagram of an example process for workflow management, according to implementations of the present disclosure.

FIG. 5 depicts a flow diagram 500 of an example process for workflow management, according to implementations of the present disclosure. Operations of the process can be performed by one or more of the workflow modification module(s) 110, the modeler interface 106, and/or other software module(s) executing in the workflow platform 102 or elsewhere.

Workflow information is accessed (502). In some implementations, this includes accessing the BPMN or other formatted information that describes a workflow. The workflow information can be accessed while the workflow is being modeled, in some instances.

A determination can be made (504) of a user task that is connected to one or more subsequent other nodes (e.g., user tasks) by one or more conditional sequence connectors, based on an analysis of the workflow information describing the workflow.

Condition information (e.g., labels) can be extracted (506) from the conditional sequence connectors, and used to automatically (and dynamically) modify (508) the user task to include decision information with branches that correspond to the extracted condition information, as described above. The modification of the user task can also include dynamically updating a presentation of the user task in the modeler interface to indicate that the user task now includes the decision information. For example, the shape of the user task node in the interface can be altered to include the decision diamonds indicating different decision branches that can be followed from the user task.

Using implementations described herein, a modeler can use conditional flows to greatly simplify the modelling of a workflow and the dynamic editing of a user task in the workflow, instead of requiring the modeler to model an exclusive gateway after the user task, and/or manually configure a decision option (as defined on the user task level) as a condition expression for an outgoing sequence flows. Accordingly, implementations enable an improved approach to modeling decision outcomes in various scenarios.

Figure 6:
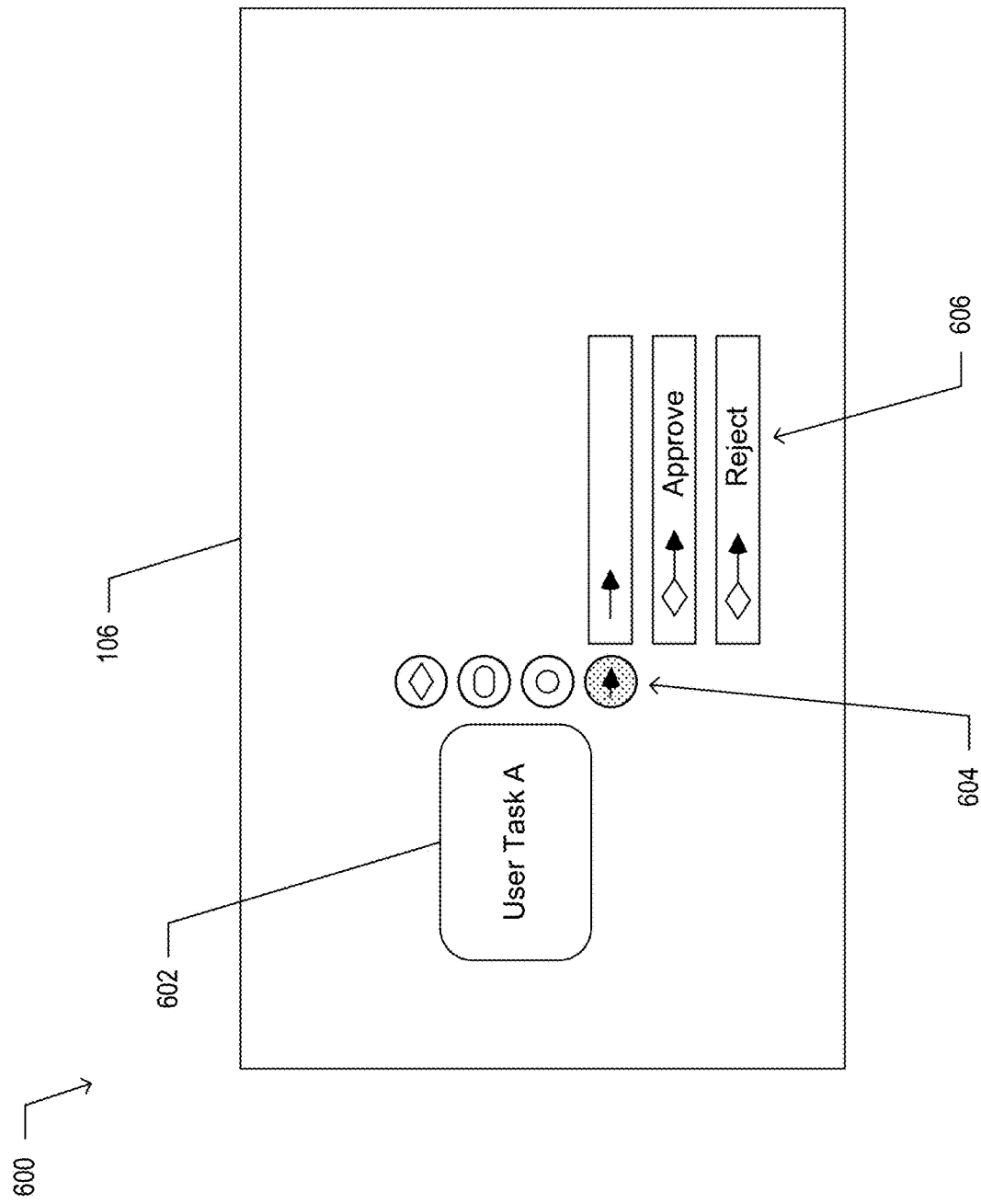
FIG. 6 depicts an example user interface with contextual menu(s), according to implementations of the present disclosure.

In some implementations, menus of (e.g., pre-configured) conditional sequence flows can be shown to enable efficient selection of pre-defined actions, as shown in FIG. 6. FIG. 6 depicts an example UI 600 with contextual menu(s) 604 and 606, according to implementations of the present disclosure. In this example, the modeler has specified a user task 602 (e.g., User Task A). Based on the user task 602, the modeler interface 106 can present a first-level menu 604 of other elements that can be added subsequent to the user task 602, such as decision nodes, other user tasks, events, and connectors. On selecting the connectors menu item, as shown in the example, the interface 106 can present a second-level menu 606 of different types of connectors, including a default sequence flow connector and (e.g., two) conditional sequence flow connectors for pre-defined actions "Approve" and "Reject." Other pre-defined actions can also be supported by implementations.

In some examples, such actions could also use additional context information, such as information regarding the area of application of the workflow, and/or information regarding other (e.g., more generally applicable) workflow patterns, such as delegation to other participants, and/or standard policies within a company (e.g., rejections are followed by a user task providing for confirmation of the rejection by a second party, such as the initiator of the workflow).

Moreover, in some examples the connectors menu 606 can include an item for a conditional sequence connector without a preconfigured label. In some instances, such an item provides a basic case that a modeler could start with and then specify the label afterwards by which the decision is updated on the task. Further, already existing decisions modeled on task 602 can be presented in the menu as separate modeling options to continue from there, e.g., in addition to or instead of the Approve/Reject options in the example shown. The menu may include items for "Approve" and "Reject" and/or any other default connectors without an already existing decision on the user task, e.g., as a convenience option for the modeler user. Items may also be included based on the additional context information described above.

Figure 7:
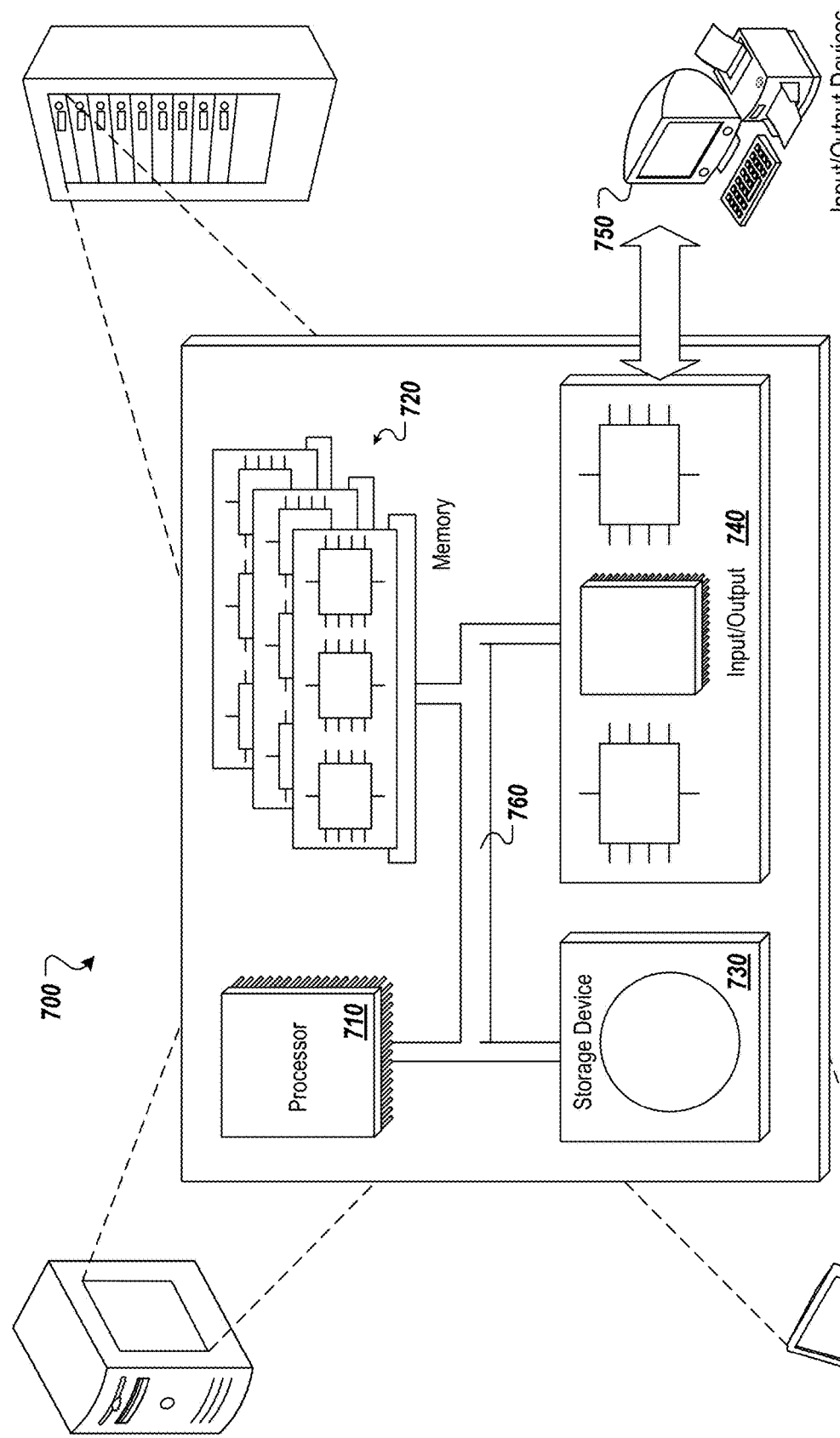
FIG. 7 depicts an example computing system, according to implementations of the present disclosure.

FIG. 7 depicts an example computing system 700, according to implementations of the present disclosure. The system 700 may be used for any of the operations described with respect to the various implementations discussed herein. For example, the system 700 may be included, at least in part, in one or more of the server computing device(s) 104, the modeler device 114, the end-user device 116, and/or other computing device(s) or system(s) described herein. The system 700 may include one or more processors 710, a memory 720, one or more storage devices 730, and one or more input/output (I/O) devices 750 controllable via one or more I/O interfaces 740. The various components 710, 720, 730, 740, or 750 may be interconnected via at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. For example, the processor(s) 710 may execute instructions for the various software module(s) described herein. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more communication networks using any network protocol.

Computing devices of the system 700 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
    accessing, by the at least one processor, workflow information describing a workflow that includes multiple nodes and at least one connector that connects at least one pair of the nodes, the workflow defined through a first user interface (UI) of a workflow management program;
    receiving, by the at least one processor and from a user interacting with the first UI of the workflow management program, one or more conditional sequence connectors, wherein each conditional sequence connector connects a user task node with a subsequent node and comprises condition information which defines a condition in which the subsequent node will be executed during run-time;
    in response to receiving the one or more conditional sequence connectors, automatically extracting, by the at least one processor, the condition information from each conditional sequence connector; and
    automatically modifying, by the at least one processor, a second UI, wherein the second UI is different from the first UI, and wherein the second UI is associated with executing the user task node, the modifying comprising:
        generating decision information based on the extracted condition information;
        incorporating the decision information into metadata that describes the user task in the workflow information;
        dynamically updating a presentation of the second UI to indicate the decision information included in the user task node; and
        rendering and enabling at least one interactive UI element associated with the decision information in the second UI.

2. The method of claim 1, wherein the decision information includes a label that is designated for the conditional sequence connector through the first UI.

3. The method of claim 1, wherein each conditional sequence connector corresponds to a branch of a decision associated with the decision information.

4. The method of claim 1, wherein the metadata is arranged according to a version of a Business Process Model and Notation (BPMN) format.

5. The method of claim 1, further comprising:
    executing, by the at least one processor, the workflow including the user task with the decision information.

6. The method of claim 1, wherein the user task is further modified to include additional decision information that is determined based on context information associated with the workflow.

7. A system comprising:
    at least one processor; and
    a memory communicatively coupled to the at least one processor, the memory storing instructions which, when executed, cause the at least one processor to perform operations comprising:
    accessing workflow information describing a workflow that includes multiple nodes and at least one connector that connects at least one pair of the nodes, the workflow defined through a first user interface (UI) of a workflow management program;
    receiving, by the at least one processor and from a user interacting with the first UI of the workflow management program, one or more conditional sequence connectors, wherein each conditional sequence connector connects a user task node with a subsequent node and comprises condition information which defines a condition in which the subsequent node will be executed during run-time;
    in response to receiving the one or more conditional sequence connectors, automatically extracting the condition information from each conditional sequence connector; and automatically modifying a second UI, wherein the second UI is different from the first UI, and wherein the second UI is associated with executing the user task node, the modifying comprising:
  generating decision information based on the extracted condition information;
  incorporating the decision information into metadata that describes the user task in the workflow information;
  dynamically updating a presentation of the a second UI to indicate the decision information included in the user task node; and
  rendering and enabling at least one interactive UI element associated with the decision information in the second UI.

8. The system of claim 7, wherein the decision information includes a label that is designated for the conditional sequence connector through the first UI.

9. The system of claim 7, wherein each conditional sequence connector corresponds to a branch of a decision associated with the decision information.

10. The system of claim 7, wherein the metadata is arranged according to a version of a Business Process Model and Notation (BPMN) format.

11. The system of claim 7, the operations further comprising:
  executing the workflow including the user task with the decision information.

12. The system of claim 7, wherein the user task is further modified to include additional decision information that is determined based on context information associated with the workflow.

13. One or more non-transitory computer-readable storage media storing instructions which, when executed, cause at least one processor to perform operations comprising:
  accessing workflow information describing a workflow that includes multiple nodes and at least one connector that connects at least one pair of the nodes, the workflow defined through a first user interface (UI) of a workflow management program;
  receiving, by the at least one processor and from a user interacting with the first UI of the workflow management program, one or more conditional sequence connectors, wherein each conditional sequence connector connects a user task node with a subsequent node and comprises condition information which defines a condition in which the subsequent will be executed during run-time;
  in response to receiving the one or more conditional sequence connectors, automatically extracting the condition information from each conditional sequence connector; and
  automatically modifying a second UI, wherein the second UI is different from the first UI, and wherein the second UI is associated with executing the user task node, the modifying comprising:
    generating decision information based on the extracted condition information;
    incorporating the decision information into metadata that describes the user task in the workflow information;
    dynamically updating a presentation of the second UI to indicate the decision information included in the user task node; and
    rendering and enabling at least one interactive UI element associated with the decision information in the second UI.

14. The one or more non-transitory computer-readable storage media of claim 13, wherein the decision information includes a label that is designated for the conditional sequence connector through the first UI.

15. The one or more non-transitory computer-readable storage media of claim 13, wherein each conditional sequence connector corresponds to a branch of a decision associated with the decision information.

16. The one or more non-transitory computer-readable storage media of claim 13, wherein the metadata is arranged according to a version of a Business Process Model and Notation (BPMN) format.

17. The one or more non-transitory computer-readable storage media of claim 13, the operations further comprising:
  executing the workflow including the user task with the decision information.

* * * * *